United States Patent [19]

Speranza et al.

[11] Patent Number: 5,086,162
[45] Date of Patent: Feb. 4, 1992

[54] POLYETHER AMIDE FROM POLYALKYLENE GLYCOL DIAMINE AND DIACID MIXTURE

[75] Inventors: George P. Speranza; Wei-Yang Su, both of Austin, Tex.

[73] Assignee: Texaco Chemical Company, White Plains, N.Y.

[21] Appl. No.: 506,990

[22] Filed: Apr. 10, 1990

[51] Int. Cl.$^5$ ............................................. C08G 69/26
[52] U.S. Cl. .................................... 528/339; 528/310; 528/329.1; 528/335; 528/347
[58] Field of Search ............. 528/339, 335, 310, 329.1, 528/347

[56] References Cited

U.S. PATENT DOCUMENTS

| | | | |
|---|---|---|---|
| 2,359,867 | 10/1944 | Martin | 260/78 |
| 4,611,051 | 9/1986 | Hayes et al. | 528/295.3 |
| 4,617,342 | 10/1986 | Poppe et al. | 524/606 |
| 4,656,242 | 4/1987 | Swan et al. | 528/295.3 |

OTHER PUBLICATIONS

*Chemical Abstracts*, vol. 31:769 ¶ 9 (1946), reporting British Patent No. 562,370.

S. Iwabuchi et al., "Darstellung und Eigenschaften von Copolyamiden mit Oxyethylenegruppen in definierter Sequenz", *Macromol. Chem.*, vol. 183 (1982), pp. 1427–1433.

J. R. Flesher, Jr., "Polyether Block Amide: High-Performance TPE", *Modern Plastics*, Sep., 1987, pp. 100–110.

*Primary Examiner*—Harold D. Anderson
*Attorney, Agent, or Firm*—Jack H. Park; Kenneth R. Priem; David L. Mossman

[57] ABSTRACT

Novel polyether amides produced by reacting at least one polyalkylene glycol diamine with at least two dicarboxylic acids or esters thereof are described. The polyethylene glycol diamine has the formula $NH_2-(CH_2CH_2O)_x-CH_2CH_2-NH_2$, where x ranges from 2 to 6, and at least one of the dicarboxylic acids is an aromatic discarboxylic acid. These novel polyether amides may have the formula:

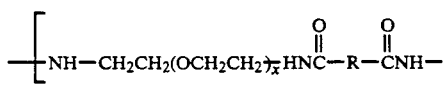

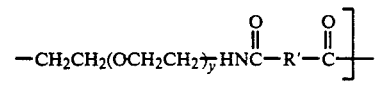

where each R and R' are independently an alkylene or arylene moiety having from 3 to 34 carbon atoms, where at least one R or R' is an arylene moiety, and where each x and y independently have the values noted. Suitable dicarboxylic acids include adipic acid, azelaic acid, sebacic acid, dodecanedioic acid, terephthalic acid, isophthalic acid, t-butyl isophthalic acid, and mixtures thereof. Suitable diamines include triethylene glycol diamine (JEFFAMINE® EDR-148 amine) and tetraethylene glycol diamine (JEFFAMINE® EDR-192 amine), among others. The resulting polyether amides are useful to make polymers, including fibers, with unusually good water absorbancy properties. The inventive methods successfully incorporate triethylene glycol diamine and aromatic dibasic acids, where this cannot be accomplished directly.

17 Claims, No Drawings

POLYETHER AMIDE FROM POLYALKYLENE GLYCOL DIAMINE AND DIACID MIXTURE

CROSS-REFERENCES TO RELATED APPLICATIONS

This application is related to U.S. patent application Ser. No. 07/507,261, filed of even date, relating to a the reaction products from a mixture of polyethylene glycol diamines and other diamines with dicarboxylic acids, and U.S. patent application Ser. No. 07/506,998, filed of even date, relating to water soluble polyether amides produced by reacting tetraethylene glycol diamine with aromatic diacids.

FIELD OF THE INVENTION

The invention relates to novel polyamides, and, in one aspect, more particularly relates to novel water soluble or water absorbing polyether amides prepared by the reaction of at least two different dicarboxylic acids with polyethylene glycol diamines.

BACKGROUND OF THE INVENTION

Triethylene and tetraethylene glycol diamines may be continuously produced from glycols catalytically. The triethylene glycol diamine and tetraethylene glycol diamine products are known under the trade names JEFFAMINE® EDR-148 amine and JEFFAMINE® EDR-192 amine, respectively, as made by Texaco Chemical Co. These materials are useful as epoxy curing agents.

It is, of course, known to react materials having primary amine groups, with compounds having carboxylic acid groups.

Of particular interest is U.S. Pat. No. 2,359,867 which teaches polymers having a high receptivity for acid dyes, which polymers are the reaction product of 75 to 95 parts by weight of a mixture of hexamethylenediamine and adipic acid in substantially equal proportions, and 5 to 25 parts by weight of a polyamide-forming composition selected from the class of (a) mixtures of diamine and dibasic carboxylic acid in substantially equimolecular proportions, and (b) monoaminomonocarboxylic acids. The polyamide-forming composition has a bifunctional polyamide-forming reactant containing at least one oxygen atom in the chain of atoms separating its amide-forming groups. Such polyamide forming reaction may include compounds of the formula $NH_2-(CH_2CH_2O)_x-CH_2CH_2-NH_2$, where x ranges from 2 to 3. Also of interest is S. Iwabuchi, et al., "Darstellung und Eigenschaften von Copolyamiden mit Oxyethylenegruppen in definierter Sequenz," *Makromol. Chem.*, Vol. 183, (1982) pp. 1427-1433. The summary to the article indicates that polyamides of the formula:

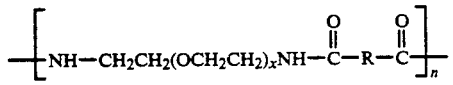

were synthesized from α,ω-diamino-substituted oligo-(oxyethylene)s and bis-chlorides of dicarboxylic acids. The copolymers contained up to five oxyethylene units per repeating unit, and properties like solubility, thermal stability and complexing ability towards alkali metal cations were influenced.

A crystalline polyamide which has improved tensile strength and which has a heat deflection temperature in excess of 240° C. when filled is formed from dicarboxylic acid compounds comprising compounds of terephthalic acid and isophthalic acid in a molar ratio of at least 80:20 to about 99:1 and diamines comprising hexamethylene diamine and trimethylhexamethylene diamine in a molar ratio of about 98:2 to about 60:40, according to U.S. Pat. No. 4,617,342.

These kinds of materials may be used for hot melt adhesives. For example, U.S. Pat. No. 4,656,242 describes that poly(ester-amide) polymers made from an acid component and a substantially equivalent amount of an amine and a diol component are suitable as hot melt adhesives for bonding plastics. The acid component has 10-80 equivalent percent of a dimer acid having about 36 carbon atoms and 40-90 equivalent percent of a linear dicarboxylic acid. The amine and diol component has from 40-90 equivalent percent of an organic diamine and 10-60 equivalent percent of a diol. Also of interest is U.S. Pat. No. 4,611,051 which teaches poly(ester-amide) hot-melt adhesives prepared from condensation of a mixture of polymeric fatty acids and 1,18-octadecanedicarboxylic acid, and a substantially equivalent proportion of a mixture of a polyamine and a polyol. Suitable polyamines include ethylenediamine, 1,3-propanediamine, 1,4-butanediamine, 1,6-hexamethylene-diamine, piperazine, and 4,4'-methylene-bis-(cyclohexylamine). Appropriate diols are ethylene glycol, 1,3-propanediol, 1,4-butanediol, 1,6-hexamethylenediol, cyclohexanemethanol, polyethylene glycol and polybutylene glycol.

See also *Chemical Abstracts*, Vol. 31:769 9 (1946) reporting Great Britain Patent 562,370 which describes a mixture of at least two preformed synthetic linear polyamides heated in the molten state at amide-forming temperatures until a homogeneous melt blend was obtained. At least one of the polyamides should be soluble in water and the other insoluble. The insoluble polyamide may be polyhexamethylene adipamide. The soluble polyamide may be one in which heteroatoms of oxygen or sulfur are present in the main polyamide chain, such as polytriglycol adipamide and N-methylpolytriglycol adipamide. The resultant polyamides had increased water-absorption properties and other improved properties.

A good, general background article about some of these amide materials is J. R. Flesher, Jr., "Polyether Block Amide: High-Performance TPE," *Modern Plastics*, September, 1987, pp. 100-110, where the family of engineering-grade thermoplastic elastomers based on block copolymers of polyethers and polyamides is discussed.

Although polyamides have been incrementally improved as shown by the publications discussed above as examples, there remains a need for new polyamides having improved water absorbancy, but which retain the beneficial properties of polyamides.

SUMMARY OF THE INVENTION

Accordingly, it is an object of the present invention to provide novel polyether amides with terephthalamide units having improved water absorbancy, and/or which are soluble in water.

It is another object of the present invention to provide novel polyether amides made from polyethylene glycol diamines and at least two different dicarboxylic acids.

Another object of the invention to provide a plurality of methods for making these novel materials that are easily implemented.

In carrying out these and other objects of the invention, there is provided, in one form, novel polyether amides produced by reacting at least one polyalkylene glycol diamine with at least two dicarboxylic acids or esters thereof, where the polyethylene glycol diamine has the formula $NH_2-(CH_2CH_2O)_x-CH_2CH_2-NH_2$, where x ranges from 2 to 6, and where at least one of the dicarboxylic acids is an aromatic dicarboxylic acid.

DETAILED DESCRIPTION OF THE INVENTION

It has been discovered that the polyethylene glycol diamines, such as JEFFAMINE® EDR amines, in particular triethylene glycol diamine and tetraethylene glycol diamine, as well as others, may be advantageously reacted with dicarboxylic acids in various ways to form novel polyether amides. These novel polyether amides are useful in applications where good water absorption is desired, such as fabrics, where it is known that some incorporation of moisture is useful in reducing the tendency of the fabric to carry an undesirable static charge.

The novel polyether amides of this invention may be made according to the reaction that may be very generally schematically represented as:

tive groups than the acid groups, at least groups that readily react with primary amine functionalities.

The novel polyether amides may be represented as the final material given above. The polyether amides may be made by a number of techniques. First, two moles of diamine may be reacted with one mole of one of the dicarboxylic acids to form an amidoamine which is in turn reacted with the second dicarboxylic acid. Secondly, one mole of diamine may be reacted with two moles of one of the dicarboxylic acids to form an amidoacid which is in turn reacted with an amidoamine formed by the reaction of two moles of diamine with one mole of the other of the dicarboxylic acids. Thirdly, one diamine may form a first salt with one of the acids, another or the same diamine may form a second salt with the other of the dicarboxylic acids, and the salts are mixed and reacted together. All of these preparation methods may take place in the presence of heat, from approximately 220° to about 300° C. as a broad range, where a narrower temperature range for this reaction is from about 250° to about 280° C. No catalyst is required for this reaction, although one may be yet discovered that might prove beneficial. The reaction may also be conducted at atmospheric pressure. The reaction is quite selective yielding the polyether amides in nearly quantitative yield. The products are generally light-colored solids. The products and methods of this invention will be described in more detail with reference to the

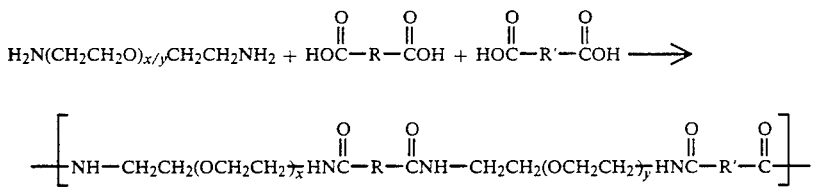

where the polyethylene glycol diamines may be the same or different, in that x and y independently range from 2 to 6, preferably 2 to 5 and most preferably from 2 to 3. When x is 2 and 3, the compounds are triethylene glycol diamine (JEFFAMINE EDR-148 amine) and tetrathylene glycol diamine (JEFFAMINE EDR-192 amine), respectively. Additionally, R and R' are independently an alkylene or arylene moiety having from 3 to 34 carbon atoms, where at least one R or R' is an arylene moiety. These molecules are unusual because, as will be explained, triethylene glycol diamine cannot be successfully reacted with aryl containing dicarboxylic acids in a straight-forward manner.

The polyether amides of this invention must use polyethylene glycol diamines. The R and R' groups in the dicarboxylic acid may be an alkylene or an arylene moiety having from 3 to 34 carbon atoms in one embodiment, in one aspect from 4 to 20 carbon atoms, and in a further aspect from 4 to 9. In another aspect of the invention, the dicarboxylic acid may be selected from the group including, but not necessarily limited to, adipic acid, pimelic acid, azelaic acid, sebacic acid, dodecanedioic acid, terephthalic acid, isophthalic acid, t-butyl isophthalic acid and mixtures thereof. The esters of these acids may also be used. As noted, one of the dicarboxylic acids must have an aryl group, which acid would include but not be limited to terephthalic acid and isophthalic acid. It is also preferred, in one embodiment, that the dicarboxylic acid not possess other reacfollowing examples.

It was discovered that the reaction of triethylene glycol diamine (JEFFAMINE EDR-148 amine) with terephthalic acid does not proceed well when pursued directly, although this combination of materials can be effectively employed using the methods and/or combination of materials of the present invention. This discovery indicates that the reaction of the diamines with the aryl dicarboxylic acids is not straight-forward, and methods and the materials produced thereby cannot be predicted from the art. The methods and materials made herein demonstrate that triethylene glycol diamine and terephthalic acid can be successfully incorporated into a novel water-soluble polyether amide.

EXAMPLES 1-2

Direct Reactions of Triethylene Glycol Diamine with Terephthalic Acid

Terephthalic acid is one of the most important dibasic acids in the polymer industry. It provides stability and toughness to the polymer. It has been discovered that advanced polyamides based on terephthalic acid having good water absorbent properties may be produced, but not by directly reacting triethylene glycol diamine with an aryl dicarboxylic acid.

Attempts were made to prepare polyamides from the salt of terephthalic acid and JEFFAMINE EDR-148 amine. No desired polyamide was observed in the reaction. It is possible that the melting points of the resulting amides and salts in the early stages are very high and the polymerization is then essentially stopped due to the result of solid phase reaction. Indeed, the product tends to decompose under the polymerization set-up if the reaction temperature is too high.

Adding more ether linkages reduces polymer crystallinity and, therefore, lowers its melting temperature. Hence, polymerization was carried out to produce polyamide from the salt of JEFFAMINE EDR-192 amine and terephthalic acid. A tough polymer was obtained. It absorbed water and could be drawn into fibers. In addition, a good product was also obtained when JEFFAMINE EDR-192 amine was reacted directly with a stoichiometric amount of terephthalic acid.

EXAMPLE 1

Reaction of JEFFAMINE EDR-148 Amine.Terephthalic Acid Salt

To a test tube was added 4.0 g. of JEFFAMINE EDR-148 amine.terephthalic acid salt. The test tube was placed into a glass reactor equipped with a nitrogen purging tube. The reactor was heated to 170° C. for one hour and then 260° C. for four hours. An off-white, very brittle solid was recovered. This result indicated that a very low molecular weight polyamide was obtained.

EXAMPLE 2

Reaction of JEFFAMINE EDR-148 Amine.Terephthalic Acid Salt

The procedure of Example 1 was followed, except that the reactor was heated to 280° C. for five hours. A dark-brown, brittle solid was obtained. This result indicated that the polyamide decomposed at 280° C.

Amidoamine Route

A two-step reaction scheme has been discovered for producing the polyether amides of the invention. This route may be represented as follows:

ples illustrate a way to incorporate terephthalamide into the polyamides.

EXAMPLE 3

General Procedure for Preparation of Amidoamines

The amidoamines used in the following examples were prepared as follows. To a 3-necked flask equipped with a stirrer, thermometer, Dean-Stark trap, and nitrogen inlet were charged the indicated aromatic dicarboxylic acid and JEFFAMINE® EDR-148 amine or EDR-192 amine at the mole ratio of 1 to 2. The reaction mixture was heated to 230° C. and held for one hour after no more water came off.

EXAMPLE 4

Reaction of Adipic Acid with Amidoamine from Terephthalic Acid and JEFFAMINE EDR-148 Amine To a 500-ml, three-necked flask equipped with a stirrer, thermometer and condenser was charged 45.3 g. of amidoamine prepared from terephthalic acid and JEFFAMINE EDR-148 amine and 300 ml of water. The mixture was stirred for one hour and 14.6 g. of adipic acid was then added. The solution was heated to 100° C. for two hours. The pH value of the resulting salt solution was checked to be 7.52. Part of the resulting salt solution (6.1 g.) was transferred into a test tube. The test tube was then placed into a glass reactor equipped with a nitrogen purging tube. The reactor was heated to 170° C. for two hours and then 260° C. for four hours. A light yellow polyether amide was obtained, which would swell in water. The product was drawn into fibers.

EXAMPLE 5

Reaction of Adipic Acid with Amidoamine from Terephthalic Acid and JEFFAMINE EDR-192 Amine The procedure of Example 4 was followed except that 56.7 g. of amidoamine prepared from terephthalic

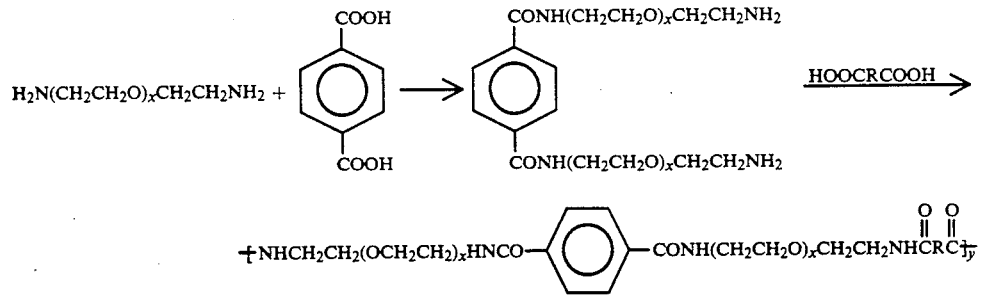

The dibasic aids include sebacic acid, adipic acid, and dodecanedioic acid, although it is expected that others may be used, as described earlier. The benzenedicarboxylic acids include terephthalic acid and isophthalic acid. Obviously, the the diamine and the dicarboxylic acid (not necessarily terephthalic acid—though one diacid must contain an aryl moiety) form the amidoamine in a molar ratio of 2:1. Although the diamines should be polyethylene glycol diamines within the definition of the invention, they do not both have to be the same diamine. The resulting polyamides are somewhat homopolymeric and show good thermostability. As expected, with the presence of terephthalic acid and polyoxyethylene chains, the polyamides are tough polymers with good water absorbent properties and can be used for fiber and adhesive applications. These examacid and JEFFAMINE EDR-192 amine, 200 ml of water, and 14.6 g. of adipic acid were used. A light yellow polyether amide which swelled in water was obtained. The product was drawn into fibers.

EXAMPLE 6

Reaction of Sebacic Acid with Amidoamine from Terephthalic Acid and JEFFAMINE EDR-148 Amine The procedure of Example 4 was followed except that 45.3 g. of amidoamine prepared from terephthalic acid and JEFFAMINE EDR-148 amine, 200 ml of water and 20.2 g. of sebacic acid were used. A brown polyether amide was obtained. It absorbed water and could be drawn into fibers. It showed good thermostability.

EXAMPLE 7

Reaction of Sebacic Acid with Amidoamine from Terephthalic Acid and JEFFAMINE EDR-192 Amine The procedure of Example 4 was followed except that 56.7 g. of amidoamine prepared from terephthalic acid and JEFFAMINE EDR-192 amine, 200 ml of water, and 20.2 g. of sebacic acid were used. A brown polyether amide was obtained. It absorbed water and could be drawn into fibers.

EXAMPLE 8

Reaction of Dodecanedioic Acid with Amidoamine from Terephthalic Acid and JEFFAMINE EDR-192 Amine The procedure of Example 4 was followed except that 23.4 g. of amidoamine prepared from terephthalic acid and JEFFAMINE EDR-192 amine, 200 ml of water, and 11.5 g. of dodecanedioic acid were used. A yellow polyether amide was obtained which would swell in water. It was drawn into fibers.

EXAMPLE 9

Reaction of Dodecanedioic Acid with Amidoamine from Terephthalic Acid and JEFFAMINE EDR-148 Amine The procedure of Example 4 was followed except that 22.4 g. of amidoamine prepared from terephthalic acid and JEFFAMINE EDR-148 amine, 300 ml of water and 11.5 g. of dodecanedioic acid were used. A light yellow polyether amide was obtained. It swelled in water and was drawn into fibers. It showed good thermostability.

EXAMPLE 10

Reaction of Adipic Acid with Amidoamine from Isophthalic Acid and JEFFAMINE EDR-192 Amine The procedure of Example 4 was followed except that 10.4 g. of amidoamine prepared from isophthalic acid and JEFFAMINE EDR-192 amine, 50 ml of water and 2.0 g. of adipic acid were used. A brown polyether amide was obtained which would swell in water. It was drawn into fibers.

EXAMPLE 11

Reaction of Adipic Acid with Amidoamine from Isophthalic Acid and JEFFAMINE EDR-148 Amine To a test tube were charged 3.3 g. of amidoamine prepared from isophthalic acid and JEFFAMINE EDR-148 amine, and 1.06 g. of adipic acid. The test tube was placed into a glass reactor equipped with a nitrogen purging tube. The reactor was heated to 170° C. for three hours and 240° C. for two hours. A yellow polyether amide was obtained. It swelled in water and was drawn into fibers.

Amidoacid Route

An alternate way to synthesize polyamides such as the ones of this invention, which contain terephthalic amide and can absorb water well will now be described. Amidoamine prepolymers of JEFFAMINE EDR amines with terephthalic acid were reacted directly with a stoichiometric amount of the amidoacid prepolymers of JEFFAMINE EDR amines with dibasic acids, respectively. The products are either sensitive to water or completely soluble in water. Moreover, polyamides have also been prepared from amidoamine prepolymers, JEFFAMINE EDR amines and dibasic acids in the presence of water, which could help create a homogeneous solution. The resulting polyamides have lower melting points because of the somewhat random structure and the incorporation of additional groups that are less stiff, i.e., polyether groups and aliphatic carbon chains as compared with aromatic groups. The products may be used for fiber and adhesive applications.

A reaction scheme using specific reactants may be diagrammed as shown below:

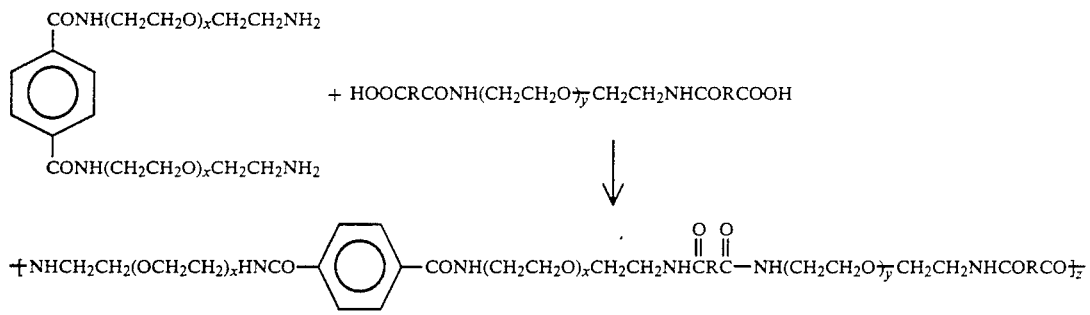

where $x$ and $y$ are independently from 2 to 6 and the value of $z$ is determined by the length of the polymer chain. Obviously, the amidoamine is made from a diamine and a dicarboxylic acid in a molar ratio of 2:1, and the amidoacid is made from a diamine and a dicarboxylic acid in a molar ratio of 1:2. The method is not limited to the particular terephthalic acid shown above, and both of the diamines should be polyethylene glycol diamines, although they need not be the same one.

EXAMPLE 12

Reaction of JEFFAMINE EDR-148 Amine/Terephthalic Acid Amidoamine With JEFFAMINE EDR-148 Amine/Adipic Acid Amidoacid To a test tube were added amidoamine prepared from JEFFAMINE EDR-148 amine and terephthalic acid (1.533 g.), amidoacid prepared from JEFFAMINE EDR-148 amine and adipic acid (1.725 g.) and water (2.0 g.). The test tube was placed into a glass reactor equipped with a nitrogen purging tube. The reactor was heated to 170° C. for one hour and then 250° C. for four hours. A light-brown elastomeric solid (m.p. 232° C.) was obtained. The product was water soluble and drawn into fibers.

EXAMPLE 13

Reaction of JEFFAMINE EDR-148 Amine/Terephthalic Acid Amidoamine With JEFFAMINE EDR-148 Amine/Dodecanedioic Acid Amidoacid The procedure of Example 12 was followed except that amidoamine prepared from JEFFAMINE EDR-148 amine and terephthalic acid (1.772 g., the same as that used in Example 12), amidoacid prepared from JEFFAMINE EDR-148 amine and dodecanedioic acid (2.444 g.) and water (2.0 g.) were used. A light-brown elastomeric solid was obtained which absorbed water and was drawn into fibers.

EXAMPLE 14

Reaction of JEFFAMINE EDR-148 Amine/Terephthalic Acid Amidoamine With JEFFAMINE EDR-148 Amine/Sebacic Acid Amidoacid The procedure of Example 12 was followed except that amidoamine prepared from JEFFAMINE EDR-148 amine and terephthalic acid (1.866 g., the same one used in Example 13), amidoacid prepared from JEFFAMINE EDR-148 amine and sebacic acid (2.354 g.) and water (2.0 g.) were used. A light-brown elastomeric solid was obtained. The product was drawn into fibers.

EXAMPLE 15

Reaction of JEFFAMINE EDR-192 Amine/Terephthalic Acid Amidoamine With JEFFAMINE EDR-148 Amine/Adipic Acid Amidoacid The procedure of Example 12 was followed except that amidoamine prepared from JEFFAMINE EDR-192 amine and terephthalic acid (1.723 g.), amidoacid prepared from JEFFAMINE EDR-148 amine and adipic acid (1.520 g., same as used in Example 12) and water (2.0 g.) were used. A brown elastomer was obtained. The product was water soluble and was drawn into fibers.

EXAMPLE 16

Reaction of JEFFAMINE EDR-148 Amine/Terephthalic Acid Amidoamine With JEFFAMINE EDR-192 Amine and Dodecanedioic Acid The procedure of Example 12 was followed except that amidoamine prepared from JEFFAMINE EDR-148 amine and terephthalic acid (1.799 g., the same as that used in Example 12), JEFFAMINE EDR-192 amine (0.426 g.), dodecanedioic acid (1.581 g.) and water (2.0 g.) were used. A light-brown elastomer was obtained. The product was drawn into nice, strong fibers.

EXAMPLE 17

Reaction of JEFFAMINE EDR-148 Amine/Terephthalic Acid Amidoamine With JEFFAMINE EDR-148 Amine and Sebacic Acid The procedure of Example 12 was followed except that amidoamine prepared from JEFFAMINE EDR-148 amine and terephthalic acid (1.858 g., the same as that used in Example 12), sebacic acid (1.597 g.) and water (2.0 g.) were used. A light-brown elastomer was obtained. The product was drawn into nice, strong fibers.

EXAMPLE 18

Reaction of JEFFAMINE EDR-192 Amine/Terephthalic Acid Amidoamine With JEFFAMINE EDR-148 Amine/Dodecanedioic Amidoacid The procedure of Example 12 was followed except that amidoamine prepared from JEFFAMINE EDR-192 amine and terephthalic acid (1.799 g., the same as that used in Example 15), amidoacid prepared from JEFFAMINE EDR-148 amine and dodecanedioic acid (1.738 g., same as that used in Example 13) and water (2.0 g.) were used. A brown elastomer was obtained. The product showed good thermostability by thermal gravimetric analysis in which 1% weight loss was found at 350° C. ($N_2$). The product was drawn into nice, strong fibers.

EXAMPLE 19

Reaction of JEFFAMINE EDR-192 Amine/Terephthalic Acid Amidoamine With JEFFAMINE EDR-148 Amine/Sebacic Amidoacid The procedure of Example 12 was followed except that amidoamine prepared from JEFFAMINE EDR-192 amine and terephthalic acid (1.844 g., the same as that used in Example 15), amidoacid prepared from JEFFAMINE EDR-148 amine and sebacic acid (1.824 g., same as that used in Example 14) and water (2.0 g.) were used. A brown elastomer was obtained. The product showed good thermostability by thermal gravimetric analysis in which 1% weight loss was found at 350° C. ($N_2$). The product swelled in water.

In summary to the amidoacid preparations, by adjusting the overall ratio of terephthalic acid, JEFFAMINE EDR amines and dibasic acids, polyether amides with a wide range of melting points can be obtained. In addition, the water absorption of the resulting polyamides can also be varied over a wide range by adjusting the overall ratio of the components. The polyamides prepared are tough and flexible and are either sensitive to water or completely soluble in water. It is also apparent that JEFFAMINE EDR-148 amine and terephthalic acid may be incorporated together in the novel polyether amides.

Mixed Salts Route

This route involves the preparation of water absorbable random copolyamide from the salt of terephthalic acid and JEFFAMINE EDR amines blended with another salt of JEFFAMINE EDR amine and a dibasic acid. In general, when a mixture of dicarboxylic acids or diamines are used as reactants, the melting point of the resulting polyamides would be decreased because of the irregular structure (random polymer) produced. Tough and hard polyamides which can be drawn into nice fibers were obtained with good water-absorbent properties. Of course, the introduction of aliphatic units also contributed to the decrease in melting point of the polyamides. The properties of these polyamides are given in Table I.

This is another alternate way to prepare polyamides containing a high degree of terephthalamide with good water absorbent properties. Especially, in the case of JEFFAMINE EDR-148 amine-terephthalic acid salt JEFFAMINE EDR-148 amine.adipic acid salt, the resulting polyamide is water soluble when the two salts are polymerized in a 50:50 ratio.

EXAMPLE 20

Reaction of JEFFAMINE EDR-148 Amine.Terephthalic Acid Salt With JEFFAMINE EDR-148 Amine.Adipic Acid Salt To a test tube was added 2.0 g. of JEFFAMINE EDR-148 amine.terephthalic acid salt, 2.0 g. of JEFFAMINE EDR-148 amine.adipic acid salt and 2.0 g. of water. The test tube was placed into a glass reactor equipped with a nitrogen purging tube. The reactor was heated to 170° C. for one hour and then 260° C. for four hours. A yellow hard polymer was obtained. The product was drawn into fibers which were water soluble.

EXAMPLE 21

Reaction of JEFFAMINE EDR-192 Amine.Terephthalic Acid Salt With JEFFAMINE EDR-192 Amine.Adipic Acid Salt The procedure of Example 20 was followed, except that 1.460 g. of JEFFAMINE EDR-192 amine.terephthalic acid salt, 1.467 g. of JEFFAMINE EDR-192 amine.adipic acid salt and 2.0 g. of water were used and the reactor was heated to 270° C. for four hours. A light-brown hard polymer was obtained. The product was moisture sensitive (water soluble) and was drawn into fibers.

EXAMPLE 22

Reaction of JEFFAMINE EDR-148 Amine.Terephthalic Acid Salt With JEFFAMINE EDR-148 Amine.Sebacic Acid Salt The procedure of Example 20 was followed, except that 1.645 g. of JEFFAMINE EDR-148 amine.terephthalic acid salt, 1.649 g. of JEFFAMINE EDR-148 amine.sebacic acid salt and 2.0 g. of water were used and the reactor was heated to 250° C. for five hours. A light-brown, tough elastomer (not tacky) was obtained. The product was drawn into fibers.

EXAMPLE 23

Reaction of JEFFAMINE EDR-148 Amine.Terephthalic Acid Salt With JEFFAMINE EDR-148 Amine.Dodecanedioic Acid Salt The procedure of Example 20 was followed, except that 1.689 g. of JEFFAMINE EDR-148 amine.terephthalic acid salt (the same one used in Example 22), 1.688 g. of JEFFAMINE EDR-148 amine.dodecanedioic acid salt and 2.0 g. of water were used. The products were light-yellow, hard solids.

EXAMPLE 24

Reaction of JEFFAMINE EDR-148 Amine.Terephthalic Acid Salt With JEFFAMINE EDR-192 Amine.Terephthalic Acid Salt The procedure of Example 20 was followed, except that 1.632 g. of JEFFAMINE EDR-148 amine.terephthalic acid salt (the same one used in Example 22), 1.614 g. of JEFFAMINE EDR-192 amine.terephthalic acid salt (the same one used in Example 21) and 2.0 g. of water were used. A yellow, hard polymer was obtained. The product was drawn into fibers.

EXAMPLE 25

Reaction of JEFFAMINE EDR-148 Amine.Isophthalic Acid Salt With JEFFAMINE EDR-148 Amine.Terephthalic Acid Salt The procedure of Example 20 was followed, except that 1.798 g. of JEFFAMINE EDR-148 amine.isophthalic acid salt, 1.792 g. of JEFFAMINE EDR-148 amine.terephthalic acid salt (the same one used in Example 22) and 2.0 g. of water were used. A light-yellow, transparent, hard solid was obtained.

EXAMPLE 26

Reaction of JEFFAMINE EDR-192 Amine.Terephthalic Acid Salt With JEFFAMINE EDR-148 Amine.Dodecanedioic Acid Salt The procedure of Example 20 was followed, except that 1.886 g. of JEFFAMINE EDR-192 amine.terephthalic acid salt (the same one used in Example 21), 1.895 g. of JEFFAMINE EDR-148 amine.dodecanedioic acid salt (the same one used in Example 23) and 2.0 g. of water were used. A yellow, tough, transparent elastomer was obtained.

TABLE I

Properties of Polyamides from Mixed Salts

| Ex. | Salt 1 | Salt 2 | Properties | Wt. Loss (%) $N_2/N_2$ 250° C. | 300° C. | 350° C. |
|---|---|---|---|---|---|---|
| 20 | Jeffamine EDR-148 amine. terephthalic acid | Jeffamine EDR-148 amine. adipic acid | Yellow, hard solid, fiber, water soluble | 1.1 | 1.2 | 2.0 |
| 21 | Jeffamine EDR-192 amine. terephthalic acid | Jeffamine EDR-192 amine. adipic acid | Light brown, hard solid, fiber, water soluble | 1.1 | 1.2 | 2.0 |
| 22 | Jeffamine EDR-148 amine. terephthalic acid | Jeffamine EDR-148 amine. sebacic acid | Light brown, tough elastomer, fiber | 1.7 | 1.8 | 3.5 |
| 23 | Jeffamine EDR-148 amine. terephthalic acid | Jeffamine EDR-148 amine.dodecanedioic acid | Light yellow, hard solid | 0.3 | 0.4 | 1.0 |
| 24 | Jeffamine EDR-148 amine. terephthalic acid | Jeffamine EDR-192 amine. terephthalic acid | Yellow, hard elastomeric, fibers | 1.5 | 2.0 | 2.8 |
| 25 | Jeffamine EDR-148 amine. isophthalic acid | Jeffamine EDR-148 amine. terephthalic acid | Light yellow, transparent, hard solid | 0.2 | 0.4 | 1.0 |
| 26 | Jeffamine EDR- | Jeffamine EDR- | Yellow, tough, | 0.4 | 0.5 | 1.0 |

TABLE I-continued

Properties of Polyamides from Mixed Salts

| Ex. | Salt 1 | Salt 2 | Properties | Wt. Loss (%) N$_2$/N$_2$ | | |
|---|---|---|---|---|---|---|
| | | | | 250° C. | 300° C. | 350° C. |
| | 192 amine.<br>terephthalic acid | 148 amine.dodec-<br>anedioic acid | transparent<br>elastomer | | | |

Many modifications may be made in the process of this invention without departing from the spirit and scope thereof which are defined only in the appended claims. For example, one skilled in the art may discover that particular reaction conditions, sequences, companion diamines, dicarboxylic acids, which may not be explicitly recited herein, but which are nevertheless anticipated, would give optimal or otherwise desirable results.

We claim:

1. A polyether amide produced by reacting at least one polyalkylene glycol diamine with at least two different dicarboxylic acids or esters thereof, where the polyethylene glycol diamine has the formula NH$_2$—(CH$_2$CH$_2$O)$_x$—CH$_2$CH$_2$—NH$_2$, where x ranges from 2 to 6, and where at least one of the dicarboxylic acids is an aromatic dicarboxylic acid.

2. The polyether amide of claim 1 where the dicarboxylic acids have the formula HOOC—R—COOH, where R is alkylene or arylene having from about 3 to about 34 carbon atoms, or esters thereof, where the other of the dicarboxylic acids is a non-aromatic dicarboxylic acid.

3. The polyether amide of claim 1 where the aromatic dicarboxylic acid is selected from the group consisting of terephthalic acid and isophthalic acid.

4. The polyether amide of claim 3 where the other of the two dicarboxylic acids is adipic acid.

5. The polyether amide of claim 1 where in the formula for the polyethylene glycol daimine x ranges from 2 to 3.

6. A polyether amide having repeating units of the formula:

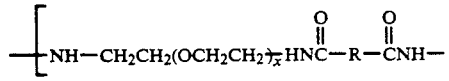

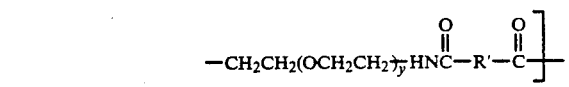

where each R and R' are independently an alkylene or arylene moiety having from 3 to 34 carbon atoms, where at least one R or R' is an arylene moiety, and where each x and y independently ranges from 2 to 6.

7. The polyether amide of claim 6 where the arylene moiety is derived from the group of aromatic dicarboxylic acids consisting of terephthalic acid and isophthalic acid.

8. The polyether amide of claim 6 where the R that is other than arylene is derived from adipic acid.

9. The polyether amide of claim 6 where in x and y independently range from 2 to 3.

10. A method of producing a polyether amide having repeating units of the formula:

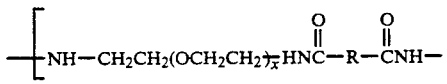

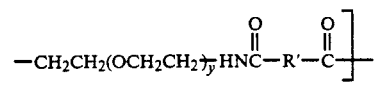

where each R and R' are independently an alkylene or arylene moiety having from 3 to 34 carbon atoms, where at least one R or R' is an arylene moiety, and where each x and y independently ranges from 2 to 6; comprising the steps of:

reacting two moles of a polyethylene glycol diamine per mole of a first dicarboxylic acid, or an ester thereof, to form an amidoamine, where the polyethylene glycol diamine has the formula NH$_2$—(CH$_2$CH$_2$O)$_x$—CH$_2$CH$_2$—NH$_2$, where x ranges from 2 to 6; and reacting the amidoamine with a subsequent compound, where the subsequent compound is selected from the group consisting of:
a second dicarboxylic acid, or an ester thereof; and
an amidoacid formed by reacting at least two moles of a second dicarboxylic acid with a polyethylene glycol diamine of the above definition where x independently ranges from 2 to 6; and
where either the first or the second dicarboxylic acid is an aromatic dicarboxylic acid.

11. The method of claim 10 where the other of the two dicarboxylic acids is a non-aromatic dicarboxylic acid.

12. The method of claim 10 where the first dicarboxylic acid and the second dicarboxylic acid are different from one another and selected independently from the group of dicarboxylic acids having the formula HOOC—R—COOH, where R is alkylene or arylene having from about 3 to about 34 carbon atoms, or ester thereof.

13. The method of claim 10 where the reaction is conducted at a temperature between about 220° and about 300° C.

14. A method of producing a polyether amide having repeating units of the formula:

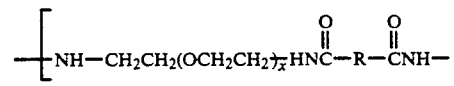

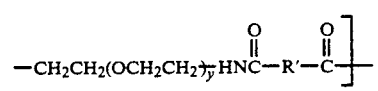

where each R and R' are independently an alkylene or arylene moiety having from 3 to 34 carbon atoms, where at least one R or R' is an arylene moiety, and where each x and y independently ranges from 2 to 6; comprising the steps of:

combining a first diamine with a first dicarboxylic acid, or an ester thereof, to form a first salt;

combining a second diamine with a second dicarboxylic acid, or an ester thereof, to form a second salt;

mixing the first salt and the second salt;

forming a polyether amide by reacting the first salt with the second salt by heating, where the first diamine and the second diamine are the same or different wherein one of the diamines has the formula $NH_2-(CH_2CH_2O)_x-CH_2CH_2-NH_2$, where x ranges from 2 to 6, and where either the first dicarboxylic acid or the second dicarboxylic acid is an aromatic dicarboxylic acid, or ester thereof, and where the dicarboxylic acids are the same or different.

15. The method of claim 14 where the reaction is conducted at a temperature between about 220° and about 300° C.

16. A method of producing a polyether amide having repeating units of the formula:

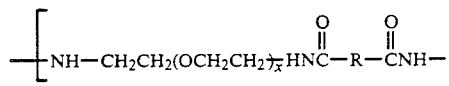

-continued

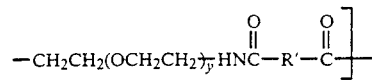

where each R and R' are independently an alkylene or arylene moiety having from 3 to 34 carbon atoms, where at least one R or R' is an arylene moiety, and where each x and y independently ranges from 2 to 6; comprising the steps of:

producing an amidoamine from a first diamine and a first dicarboxylic acid, or an ester thereof, in a molar ratio of 2:1;

producing an amidoacid from a second diamine and a second dicarboxylic acid, or an ester thereof, in a molar ratio of 1:2; and forming a polyether amide by reacting the amidoamine with the amidoacid, where the first diamine and the second diamine are the same or different wherein one of the diamines has the formula $NH_2-(CH_2CH_2O)_x-CH_2CH_2-NH_2$, where x ranges from 2 to 6, and the first dicarboxylic acid and the second dicarboxylic acid are the same or different, wherein one dicarboxylic acids is an aromatic dicarboxylic acid.

17. The process of claim 16 where the reaction is conducted at a temperature between about 220° and about 300° C.

* * * * *